Patented Jan. 11, 1938

2,105,197

UNITED STATES PATENT OFFICE 2,105,197

MEDICAMENT

Adella McCrea, Detroit, Mich., assignor to Parke, Davis & Company, Detroit, Mich., a corporation of Michigan No Drawing. Application July 13, 1931, Serial No. 550,630

7 Claims. (Cl. 167—63)

The invention relates to a therapeutic agent useful in treating certain fungous infections such as dermatomycosis, epidermomycosis and epidermophytosis. This disease is very common throughout the entire world and is often referred to as "athlete's foot-itch", "dhobie itch", "jockey-strap itch", etc. It is caused by certain fungi among which *Trichophyton interdigitale* is one of the most resistant forms.

My invention resides in the discovery of a new class of medicaments for the treatment of the above mentioned disease and more particularly to certain compositions for eliminating the fungous infection without causing pain or irritability of the infected tissues.

The therapeutic agent made in accordance with my invention contains in its preferred form at least two main ingredients; first a material for keratolyzing and desquamating the tissues of fungous lesions, and second a material for relieving the irritation caused by the kerotolyzing and desquamating action.

The first material may be selected from a wide variety of substances such for example as: Salicylic acid, mercury salicylate, phenols, tar ointment, benzoic acid.

The above materials may be used either singly or in suitable combinations.

It is also to be understood that other substances may be substituted for those listed providing they have the required kerotolyzing and desquamating properties.

The second material of the formula may be selected from three or more different classes, all of which are of an anesthetic nature and are capable of reducing the irritability caused by keratolyzing and desquamating. One of the classes comprises materials which are merely anesthetic in their action such as butyn, novocaine, etc. A second class comprises materials which are not only anesthetic but also fungistatic agents such as chlorbutanol and brombutanol. The third class comprises materials that are fungicidal as well as mild anesthetic agents and includes such materials as the high molecular weight phenols and polyhalogenated phenols. Examples are trichlorphenol, tribromphenol and bromnaphthol, etc.

In preparing a therapeutic agent in accordance with my invention suitable proportions of the two main ingredients above discussed are combined preferably in a suitable carrier adapted to form a salve. The carrier may be selected from such materials as lanolin, wax, petrolatum, cocoa butter, etc., and usually has incorporated therein small amounts of essential oils or other materials for imparting a pleasant odor to the mixture.

An example of a prefered formula is as follows:

| | Per cent |
|---|---|
| Lanolin | 60 |
| Water | 10 |
| Petrolatum | 9 |
| White wax | 6 |
| Chlorbutanol (trichlortertiary butyl alcohol) | 5 |
| Salicylic acid | 4 |
| Mercury salicylate | 4 |
| Sodium citrate | 1 |
| Oil of cloves | 0.5 |
| Oil of cinnamon | 0.5 |
| | 100 |

Another formula coming within the purview of the invention is:

| | Per cent |
|---|---|
| Lanolin | 60 |
| Water | 10 |
| Petrolatum | 9 |
| White wax | 6 |
| Chlorbutanol (trichlortertiary butyl alcohol) | 5 |
| Salicylic acid | 3 |
| Benzoic acid | 5 |
| Sodium citrate | 1 |
| Oil of cloves | 0.5 |
| Oil of cinnamon | 0.5 |
| | 100 |

Another modification of the invention contains:

| | Per cent |
|---|---|
| Phenol | 2 |
| Zinc oxide | 20 |
| Tar ointment | 23 |
| Ointment of rose water | 50 |
| Chlorbutanol | 5 |
| | 100 |

In the specific examples given above the component for reducing irritability of the mixture is chlorbutanol. However, it is to be understood that other materials as heretofore listed may be substituted for the chlorbutanol.

In certain broader aspects, my invention consists in the discovery that chlorbutanol and other halogenated tertiary butyl alcohols have a fungistatic action on *Trichophyton interdigitale* and other fungi which cause dermatomycosis, epidermomycosis and epidermophytosis and are beneficial in inhibiting proliferation of the fungus causing "athlete's foot-itch".

Thus it comes within the purview of the invention to incorporate chlorbutanol and its equivalent homologues in any therapeutic agent for the topical treatment of fungus infections of the type of dermatomycosis, epidermomycosis and epidermophytosis where the newly discovered properties may be used for combating *Trichophyton interdigitale* and other fungi causing dermatomycosis, epidermomycosis and epidermophytosis.

What I claim as my invention is:

1. A therapeutic agent for treatment of fungous infection of the type of dermatomycosis, epidermomycosis and epidermophytosis comprising an ointment base, salicylic acid, mercury salicylate and chlorbutanol.

2. A therapeutic agent for treatment of dermatomycosis, epidermomycosis and epidermophytosis comprising a keratolyzing and desquamating agent of the class consisting of salicylic acid, mercury salicylate, phenols, tar ointment and benzoic acid and a material incorporated therein of the class consisting of butyn, novocaine, chlorbutanol, brombutanol, trichlorphenol, tribromphenol and bromnaphthol.

3. A therapeutic agent for the topical treatment of fungus infections of the type of dermatomycosis, epidermomycosis and epidermophytosis comprising a salicylic acid compound having a keratolyzing and desquamating action and a halogenated tertiary butyl alcohol capable of relieving the irritation caused by said salicylic acid compound at the site of said fungus infections and having a fungistatic action on said fungus infections.

4. A therapeutic agent for the topical treatment of fungus infections including *Trichophyton interdigitale* and other fungi causing dermatomycosis, epidermomycosis and epidermophytosis comprising a salicylic acid compound having a keratolyzing and desquamating action and chlorbutanol capable of relieving the irritation caused by said salicylic acid compound at the site of said infections and having a fungistatic action on said infections.

5. A therapeutic agent for the topical treatment of fungus infections of the type of dermatomycosis, epidermomycosis and epidermophytosis comprising an ointment including lanolin, petrolatum and wax, a keratolyzing and desquamating agent including salicylic acid and mercury salicylate and chlorbutanol in amount sufficient to relieve the irritation caused by said keratolyzing and desquamating agent at the site of said fungus infections and having a fungistatic action on said fungus infections.

6. A therapeutic agent for the topical treatment of fungus infections of the type of dermatomycosis, epidermomycosis and epidermophytosis having substantially the following composition:—lanolin 60%, water 10%, petrolatum 9%, white wax, 6%, chlorbutanol 5%, salicylic acid 4%, mercury salicylate 4% and sodium citrate 1%.

7. A therapeutic agent for the topical treatment of fungus infections including *Trichophyton interdigitale* and other fungi causing dermatomycosis, epidermomycosis and epidermophytosis comprising an ointment base, a salicylic acid compound having a keratolyzing and desquamating action and chlorbutanol in an amount on the order of 5% having fungicidal action on *Trichophyton interdigitale* and having anesthetic action adapted to counteract irritation caused by said salicylic acid compound.

ADELIA McCREA.